United States Patent

[11] 3,610,854

| [72] | Inventor | Sandord I. Greene<br>Massapequa, N.Y. |
|---|---|---|
| [21] | Appl. No. | 12,255 |
| [22] | Filed | Feb. 18, 1970 |
| [45] | Patented | Oct. 5, 1971 |
| [73] | Assignee | Fairchild Camera and Instrument Corporation |

[54] FLUID-LEVEL SENSOR FOR A MULTIPLE FLUID-SUPPLY SYSTEM
5 Claims, 2 Drawing Figs.

[52] U.S. Cl. .................................................. 200/84 R,
340/52, 73/308
[51] Int. Cl. ...................................................... H01h 35/18
[50] Field of Search .......................................... 200/84,
83.9; 340/52 C; 73/311, 308, 313

[56] References Cited
UNITED STATES PATENTS

| 2,467,189 | 4/1949 | Coehen et al. | 200/84 |
|---|---|---|---|
| 2,717,935 | 9/1955 | Hartwick | 200/84 |
| 2,866,866 | 12/1958 | Laplante | 200/84 |
| 3,342,960 | 9/1967 | Dillon et al. | 200/84 C |
| 3,448,579 | 6/1969 | Reznicek | 340/52 C |

Primary Examiner—David Smith, Jr.
Attorney—Laurence B. Dodds

ABSTRACT: A fail-safe fluid-level sensor for a system including a plurality of independent fluid supplies comprises a housing of conductive material having two fluid-supply compartments separated by a common wall and a top closure member therefor. A pair of conductive electrically interconnected supporting brackets in the form of a unitary stirrup straddling the common wall are individually disposed in the compartments and the supporting brackets are conductively connected to the housing. A float is disposed in each of the compartments. A contact structure includes two contact elements each extending through the top closure member into one of the housing compartments. An arm is connected to each of the floats and pivotally and conductively connected to its respective bracket, each of the arms having a conductive extension disposed to engage the contact element in its respective compartment only when the fluid level therein reaches a predetermined value, thereby to complete an electrical circuit between said brackets and said contact structure.

FLUID-LEVEL SENSOR FOR A MULTIPLE FLUID-SUPPLY SYSTEM

BACKGROUND OF THE INVENTION

While this invention is of general application, it is particularly adapted for monitoring a dual fluid brake system for automobiles.

In applicant's prior copending application Ser. No. 668,556, filed Sept. 18, 1967, now U.S. Pat. No. 3,534,329, issued Oct. 13, 1970, and assigned to the same assignee as the present application, there is described and claimed a fluid pressure sensor system suitable for monitoring a dual fluid brake system for automobiles. That sensor system embodies a dual-chamber fluid pressure capsule having two chambers in fluid contact with dual chambers of a fluid reservoir. An arrangement of electric switches within the capsule responds to low pressure in either or both of the chambers and, in association with external circuitry, develops an alarm signal.

The present invention comprises a modification of, and improvement upon, the sensor system described in aforesaid U.S. Pat. No. 3,534,329 in which the sensor responds directly to fluid levels in the chambers of a fluid reservoir.

SUMMARY OF THE INVENTION

In accordance with the invention, a fail-safe fluid-level sensor for a system including a plurality of independent fluid supplies comprises a housing having a plurality of independent fluid-supply compartments, a plurality of conductive electrically interconnected supporting brackets individually disposed in the compartments, a float in each of the compartments, a unitary contact structure including a contact surface disposed in each of the compartments, and an arm connected to each of the floats and pivotally and conductively connected to its respective bracket. Each of the float arms has a conductive extension disposed to engage the contact surface in its respective compartment only when the fluid level therein reaches a predetermined value, thereby to complete a single electrical circuit whenever the fluid level in either of the compartments reaches such predetermined value.

For a better understanding of the present invention, together with other and further objects thereof, reference is had to the following description, taken in connection with the accompanying drawing, while its scope will be pointed out in the appended claims.

BRIEF DESCRIPTION OF THE DRAWING

FIG. 1 is a cross-sectional view of a fluid-level sensor embodying the invention, partly schematic, while

DESCRIPTION OF THE PREFERRED EMBODIMENT

Figure 1:
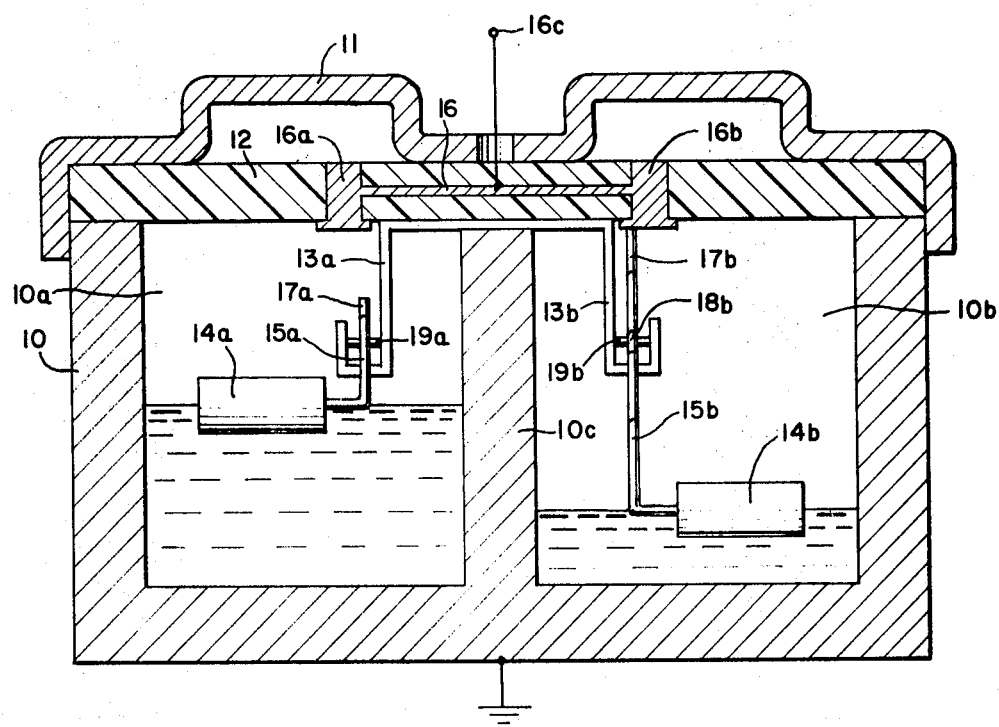

Referring now to FIG. 1 of the drawing, there is represented a fail-safe fluid-level sensor for a system including a plurality of independent fluid supplies comprising a housing 10 of conductive material having two fluid supply compartments 10a and 10b separated by a common wall 10c. A top closure member such as a spring cover 11 closes and seals the compartments 10a,10b with the aid of a sealing gasket 12.

The sensor further comprises a pair of conductive electrically interconnected supporting brackets 13a,13b individually disposed in the compartments 10a,10b, respectively, in the form of a unitary stirrup straddling the common wall 10c. Also disposed in the compartments 10a,10b are floats 14a,14b to which are connected arms 15a,15, each of these arms being pivotally and conductively connected to the respective one of the brackets 13a,13b. There is also provided a contact structure 16 having contact elements 16a,16b projecting through the gasket 12 and including contact surfaces disposed in the upper portions of the compartments 10a,10b, respectively. The contact structure 16 is provided with an external lead and terminal 16c while the conductive casing is grounded, as shown.

Each of the arms 15a,15b supporting the floats 14a,14b respectively, has a conductive extension such as the extensions 17a,17b disposed to engage the contact surface in its respective compartment only when the fluid level therein reaches a predetermined value, thereby to complete an electrical circuit between the brackets 13a,13b, and thus the conductive housing 10, and the contact structure including the contact elements 16a,16b.

Figure 2:
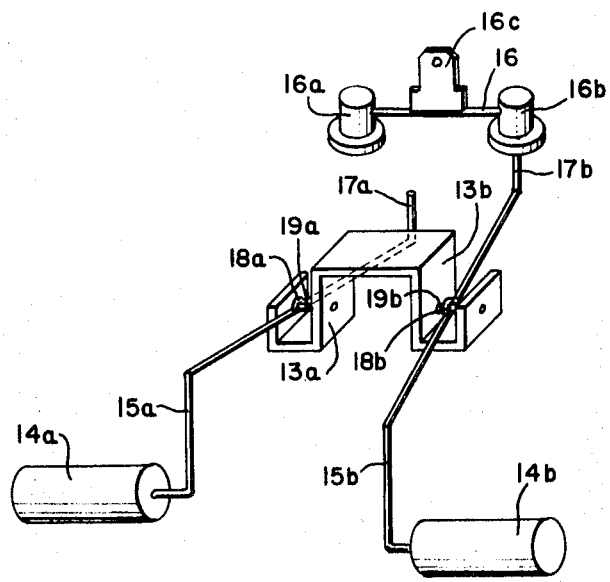
FIG. 2 is an exploded perspective view of the operating mechanisms of the sensor of FIG. 1.

The nature of the actuating mechanism of the sensor of FIG. 1 is shown somewhat more clearly in the perspective schematic diagram of FIG. 2. In order to simplify the construction, thereby reducing cost, the arms 15a,15b are constructed of preformed wires attached to the floats 14a,14b, respectively, and having loops 18a, 18b, only the latter of which is visible, resiliently but loosely engaging pins 19a,19b extending through reversely bent portions of the brackets 13a,13b, respectively.

It is believed that the operation of the fluid level sensor of the invention will be apparent from the foregoing description. Assume that the level of the fluid in the housing compartments 10a,10b is as shown in FIG. 1 of the drawing. The float 14b, responding to a low fluid level in compartment 10b, is effective to engage the conductive extension 17b with the contact respectively. 16b, thereby indicating a low fluid level in one of the compartments of the sensor. On the other hand, the float 14a, responsive to the higher fluid level in the compartment 10a, disengages the conductive extension 17a of arm 15a from contact element 16a. Nevertheless, the closing of the circuit through the contacts 16b,17b is sufficient to signal an alarm. In fact, an alarm will always be signalled if the fluid level in either of the compartments 10a,10b is below a predetermined setting.

Thus it is seen that the fluid-level sensor of the invention is effectively fail-safe in that a dropping of the fluid level in either or both of the fluid compartments signals an alarm. Furthermore, the sensor is combined directly with the fluid reservoir itself, avoiding the requirement of an auxiliary fluid pressure capsule. In addition, the fluid level sensor of the invention gives a positive alarm signal in the event of low fluid level in either of the compartments, rather than a negative signal as in applicant's aforesaid U.S. Pat. No. 3,534,329 which utilizes an auxiliary relay for reversing the negative signal into a positive signal.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications which fall within the true spirit and scope of the invention.

What is claimed is:

1. A fail-safe fluid-level sensor for a system including a plurality of independent fluid supplies comprising:
   - a housing having a plurality of independent fluid supply compartments;
   - a plurality of conductive electrically interconnected supporting brackets individually disposed in said compartments;
   - a float in each of said compartments;
   - a unitary contact structure including a contact surface disposed in each of said compartments;
   - and an arm connected to each of said floats and pivotally and conductively connected to its respective bracket,
   - each of said arms having a conductive extension disposed to engage the contact surface in its respective compartment only when the fluid level therein reaches a predetermined value, thereby to complete a single electrical circuit whenever the fluid level in either of said compartments reaches said predetermined value.

2. A fail-safe fluid-level sensor in accordance with claim 1 in which said housing has two fluid supply compartments separated by a common wall and in which the supporting brackets disposed in said compartments are in the form of a unitary stirrup straddling said common wall.

3. A fail-safe fluid-level sensor in accordance with claim 1 in which said contact structure is a contact assembly including a contact element disposed in the upper portion of each of said compartments.

4. A fail-safe fluid-level sensor in accordance with claim 3 in which one or more top closure members are provided for said housing compartments and in which each contact element of said contact assembly extends through the top closure member of its respective compartment.

5. A fail-safe fluid-level sensor in accordance with claim 1 in which said housing is of conductive material and said supporting brackets are conductively connected to said housing.